US010955857B2

(12) United States Patent
Castorena Martinez et al.

(10) Patent No.: US 10,955,857 B2
(45) Date of Patent: Mar. 23, 2021

(54) STATIONARY CAMERA LOCALIZATION

(71) Applicant: Ford Global Technologies, LLC, Dearborn, MI (US)

(72) Inventors: Juan Enrique Castorena Martinez, Southfield, MI (US); Codrin Cionca, Ann Arbor, MI (US); Zhen Zhao, Farmington Hills, MI (US); Mostafa Parchami, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 16/149,441

(22) Filed: Oct. 2, 2018

(65) Prior Publication Data
US 2020/0103920 A1 Apr. 2, 2020

(51) Int. Cl.
*G01S 17/88* (2006.01)
*G01S 17/02* (2020.01)
(Continued)

(52) U.S. Cl.
CPC .......... *G05D 1/0276* (2013.01); *G01S 7/4802* (2013.01); *G01S 17/42* (2013.01); *G01S 17/86* (2020.01); *G01S 17/931* (2020.01); *G05D 1/0231* (2013.01); *G06T 7/74* (2017.01); *G06T 7/80* (2017.01); *G08G 1/096708* (2013.01); *G08G 1/166* (2013.01); *G05D 2201/0213* (2013.01); *G06T 2207/10016* (2013.01); *G06T 2207/10028* (2013.01); *G06T 2207/20212* (2013.01); *G06T 2207/30236* (2013.01);
(Continued)

(58) Field of Classification Search
CPC ...... G05D 1/00; G05D 1/0276; G05D 1/0231;
G05D 2201/0213; G06T 7/74; G06T 7/80; G06T 2207/10016; G06T 2207/10028; G06T 2207/20212; G06T 2207/30236; G06T 2207/30261; G01S 17/931; G01S 17/86; G01S 17/4802; G01S 17/42; G01S 7/00; G01S 7/003; G08G 1/00; G08G 1/16; G08G 1/166; G08G 1/096708; G02B 27/00; G02B 17/00; B60W 30/00; B60W 30/08
See application file for complete search history.

(56) References Cited

U.S. PATENT DOCUMENTS 9,251,590 B2  2/2016  Sharp et al.
9,875,557 B2  1/2018  Napier et al.
(Continued)

OTHER PUBLICATIONS

Wolcott, et. al., "Visual Localization Within LIDAR Maps for Automated Urban Driving", published in IEEE/RSJ International Conference on Intelligent Robots and System, Sep. 14-18, 2014, retrieved from Internet URL: https://ieeexplore.ieee.org/document/6942558 (8 pages).
(Continued)

*Primary Examiner* — Yonel Beaulieu
(74) *Attorney, Agent, or Firm* — Frank A. MacKenzie; Bejin Bieneman PLC

(57) ABSTRACT

A computing system receives first sensor data including moving objects and multi-modal LiDAR map data wherein the first sensor is calibrated based on a cost function that alternates between LiDAR map point cloud data and LiDAR map ground reflectivity data as input. The computing system can operate the vehicle based on the moving objects.

20 Claims, 5 Drawing Sheets

(51) Int. Cl.

| | | |
|---|---|---|
| *G01S 17/42* | (2006.01) | |
| *G06T 7/80* | (2017.01) | |
| *G08G 1/16* | (2006.01) | |
| *G05D 1/00* | (2006.01) | |
| *B60W 30/08* | (2012.01) | |
| *G02B 17/00* | (2006.01) | |
| *G05D 1/02* | (2020.01) | |
| *G01S 7/48* | (2006.01) | |
| *G06T 7/73* | (2017.01) | |
| *G08G 1/0967* | (2006.01) | |
| *G01S 17/86* | (2020.01) | |
| *G01S 17/931* | (2020.01) | |

(52) U.S. Cl.
CPC ............... *G06T 2207/30241* (2013.01); *G06T 2207/30261* (2013.01)

(56) References Cited

U.S. PATENT DOCUMENTS

| | | | |
|---|---|---|---|
| 9,911,340 | B2 | 3/2018 | Samarasekera et al. |
| 9,979,957 | B2 | 5/2018 | Okouneva |
| 9,989,969 | B2 | 6/2018 | Eustice et al. |
| 10,445,599 | B1* | 10/2019 | Hicks .................... G05D 1/0246 |
| 10,627,512 | B1* | 4/2020 | Hicks ......................... G06T 5/50 |
| 2005/0190972 | A1 | 9/2005 | Thomas et al. |
| 2009/0110267 | A1 | 4/2009 | Zakhor et al. |
| 2017/0039765 | A1* | 2/2017 | Zhou .......................... G06T 7/55 |
| 2017/0146801 | A1* | 5/2017 | Stempora ............. G06Q 10/063 |
| 2017/0200273 | A1 | 7/2017 | Kamilov et al. |
| 2019/0154439 | A1* | 5/2019 | Binder .................... G01S 15/08 |
| 2019/0266779 | A1* | 8/2019 | Kulkarni ............... G06T 11/001 |
| 2019/0377216 | A1* | 12/2019 | Hyodo ................ H01L 29/7869 |
| 2019/0383941 | A1* | 12/2019 | Siddiqui .................... G06T 7/20 |
| 2019/0385025 | A1* | 12/2019 | McMichael ........ G06K 9/00791 |
| 2019/0385317 | A1* | 12/2019 | Laur ..................... G05D 1/0253 |
| 2019/0387185 | A1* | 12/2019 | Hicks ....................... H04N 5/33 |
| 2020/0132850 | A1* | 4/2020 | Crouch ................... G01S 17/32 |
| 2020/0284883 | A1* | 9/2020 | Ferreira ................ G01S 7/4811 |

OTHER PUBLICATIONS

De Silva, et. al., Fusion of LiDAR and Camera Sensor Data for Environment Sensing in Driverless Vehicles, IEEE Sensors Journal, ResearchGate, Oct. 2017, retrieved from Internet URL: https://www.researchgate.net/publication/320464876 (9 pages).

Castorena, et. al., "Autocalibration of Lidar and Optical Cameras via Edge Alignment", 2016 IEEE International Conference on Acoustics, Speech and Signal Processing (ICASS), retrieved from Internet URL: https://ieeexplore.ieee.org/document/7472200/ (2 pages).

Asvadi, et. al., "Multimodal Vehicle Detection—Fusing 3D-LIDAR and Color Camera Data", ScienceDirect, retrieved from Internet URL: https://www.sciencedirect.com/science/article/pii/S0167865517303598 (3 pages).

\* cited by examiner

STATIONARY CAMERA LOCALIZATION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
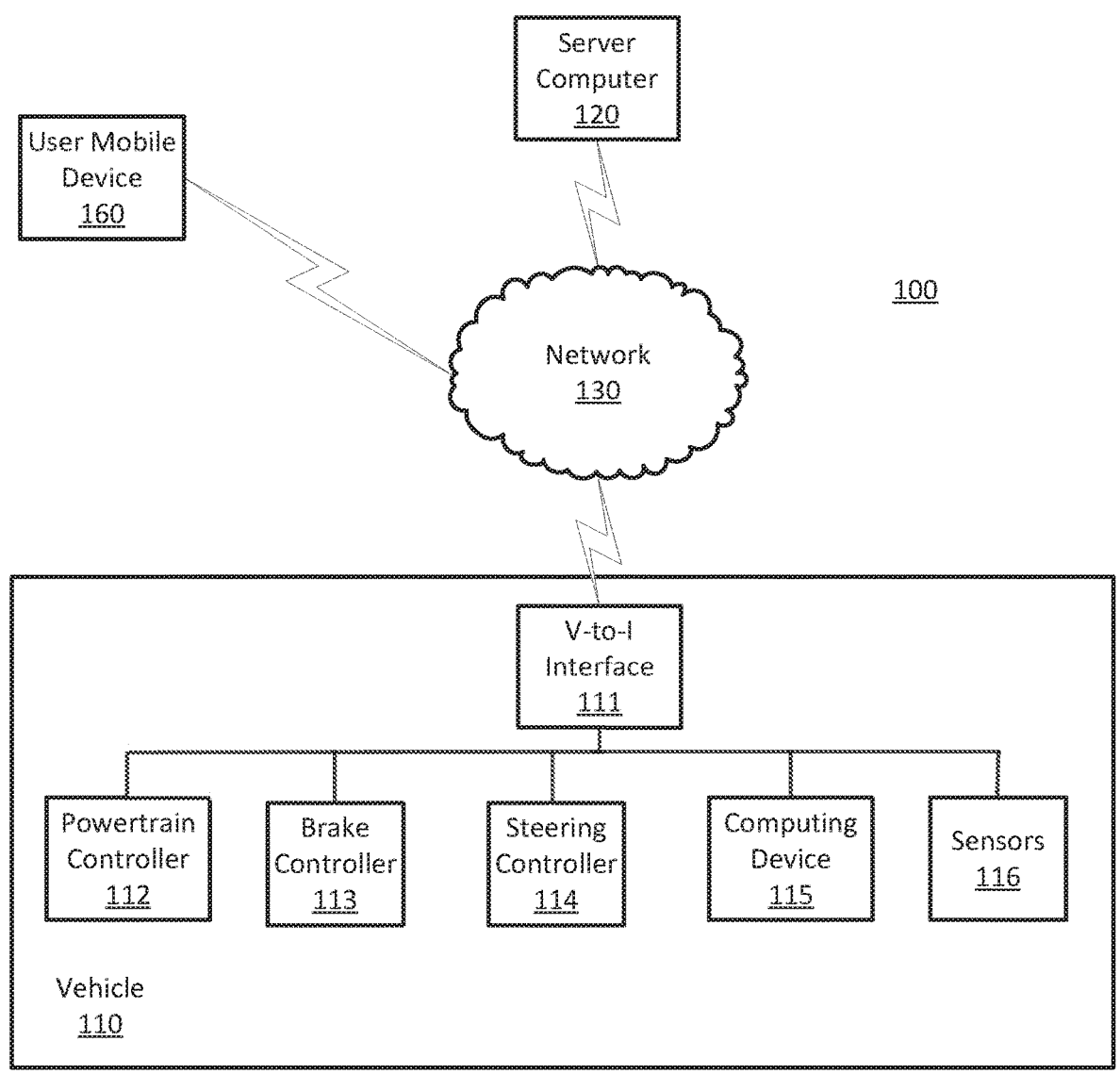
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate vehicle on a roadway in traffic including other vehicles. Based on sensor data, a computing device can determine a path for a vehicle to travel to reach a destination on a roadway in the presence of other vehicles and pedestrians, wherein a path is defined as a line connecting successive locations and trajectories of a vehicle as it moves from a first location on a roadway to a second location on a roadway that does not include collisions with objects including other vehicles and pedestrians, for example. A path wherein the line connecting a first location and a second location is defined by a first, second or third degree polynomial function will be referred to herein as a path polynomial.

Vehicles can also rely on data from a traffic infrastructure system to determine a path on which to travel to reach a destination. Traffic infrastructure systems can include stationary video sensors including single image sensors to acquire data regarding moving objects within the respective fields of view of the stationary video sensors. The stationary video sensors can be calibrated based on LiDAR map information in a real world coordinate frame which was acquired from one of a plurality of platforms that can include a vehicle equipped with LiDAR sensors, a drone equipped with LiDAR sensors, and one or more traffic infrastructure nodes equipped with LiDAR sensors. A traffic infrastructure system can communicate data regarding moving objects to vehicles depending upon a real world location of the moving objects with respect to the vehicle. Determining the real world location of the moving objects with respect to the vehicle can depend upon calibrating stationary video sensors with LiDAR map information to permit locations to permit real world 3D locations to be accurately determined for features including moving objects determined by processing stationary video sensor data, wherein the real world 3D locations are based on a pixel locations of the features in stationary video sensor image data and intrinsic stationary video sensor information regarding video sensor field of view including optical center and magnification, for example.

Disclosed herein is a method, including receiving first sensor data including moving objects and multi-modal LiDAR map data, wherein the first sensor is calibrated based on a cost function that alternates between LiDAR point cloud data and LiDAR ground reflectivity data as input, and operating a vehicle based on the moving objects. The first sensor can be a stationary video sensor, and the multi-modal LiDAR map data is acquired with a LiDAR sensor. The stationary video sensor can be calibrated by projecting LiDAR map point cloud data onto a stationary video sensor image reference coordinate frame based on a 3D pose and a field of view of the stationary video sensor. The stationary video sensor can be calibrated by projecting LiDAR ground reflectivity data onto the stationary video sensor reference coordinate frame based on a 3D pose and the field of view of the stationary video sensor. The stationary video sensor can be calibrated by determining edge miss-alignment cost (EC) between projected LiDAR map point cloud edge data and video edge data, determining normalized mutual information (NMI) between projected LiDAR ground reflectivity data and ground extracted stationary video sensor data, and alternating between EC and NMI to optimize the cost function.

A convergence of the cost function can be determined by comparing a difference between results of a current iteration and results of a previous iteration with a constant determined by user input. Operating the vehicle can include determining a cognitive map of an environment around the vehicle including downloading map data from a server computer and projecting moving objects in the first and second sensor data onto the cognitive map. Operating the vehicle can include determining a path polynomial including vehicle trajectories on the cognitive map. Determining the path polynomial can include avoiding collisions and near-collisions with moving objects on the cognitive map. Determining the polynomial function can include staying within lower and upper limits on latitudinal and longitudinal accelerations. Determining a cognitive map can be based on determining a 3D vehicle pose based on vehicle sensor data including GPS and INS. The cognitive map can be determined based on combining map data downloaded from a server computer with vehicle sensor data. The moving objects can be out of the fields of view of vehicle sensors.

Further disclosed is a computer readable medium, storing program instructions for executing some or all of the above method steps. Further disclosed is a computer programmed for executing some or all of the above method steps, including a computer apparatus, programmed to receive first sensor data including moving objects and multi-modal LiDAR map data, wherein the first sensor is calibrated based on a cost function that alternates between LiDAR map point cloud data and LiDAR map reflectivity data as input, and operate a vehicle based on the moving objects. The first sensor is a stationary video sensor and the multi-modal LiDAR map can be acquired from a LiDAR sensor of a plurality of LiDAR sensors. The stationary video sensor can be calibrated by projecting LiDAR map point cloud data onto a stationary video sensor image reference coordinate frame based on a 3D pose and a field of view of the video sensor. The stationary video sensor can be calibrated by projecting LiDAR map reflectivity data onto the stationary video sensor image reference coordinate frame based on a 3D pose and the field of view of the video sensor. The stationary video sensor can be calibrated by determining edge miss-alignment cost (EC) between projected LiDAR map point cloud edge data and video edge data, determining normalized mutual information (NMI) between projected LiDAR map ground reflectivity data and ground extracted stationary video sensor data, and alternating between EC and NMI to optimize the cost function.

The computer can be further programmed to determine a convergence of the cost function by comparing a difference between results of a current iteration and results of a previous iteration with a constant determined by user input. Operating the vehicle can include determining a cognitive map of an environment around the vehicle including downloading map data from a server computer and projecting moving objects in video sensor data onto the map. Operating the vehicle can include determining a path polynomial including vehicle trajectories on the cognitive map. Determining the path polynomial can include avoiding collisions and near-collisions with moving objects on the cognitive map. Determining the polynomial function can include staying within lower and upper limits on latitudinal and longitudinal accelerations. Determining a cognitive map can be based on determining a 3D vehicle pose based on vehicle sensor data including GPS and INS. The cognitive map can be determined based on combining map data downloaded from a server computer with vehicle sensor data. The moving objects can be out of the fields of view of vehicle sensors.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator.

Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
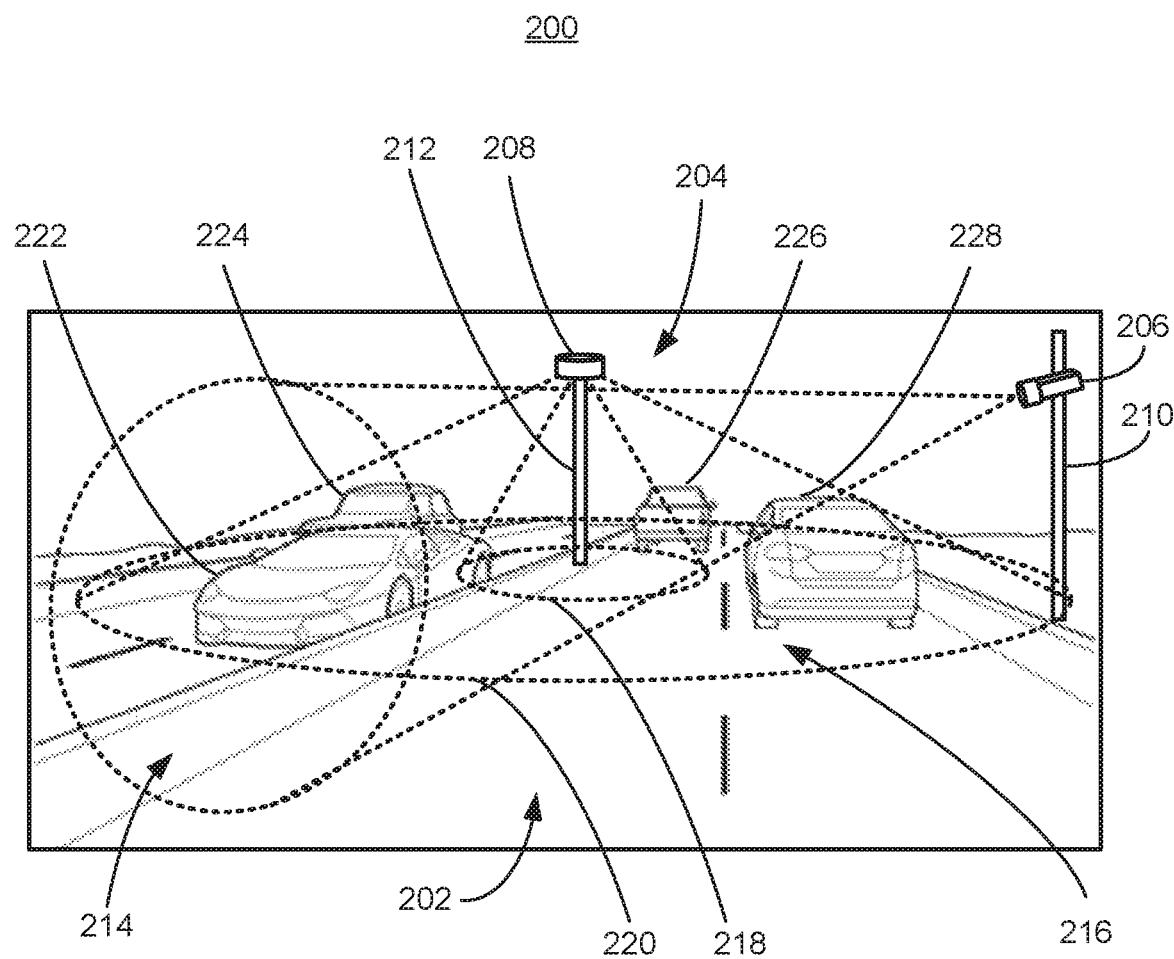
FIG. 2 is a diagram of an example traffic scene.

FIG. 2 is a diagram of an example traffic scene 200. Traffic scene 200 includes a roadway 202, vehicles 222, 224, 226, 228, indicated collectively and individually by the reference numeral 204, a stationary video sensor 206 and a stationary LiDAR sensor 208. As used herein, the term video sensor data will include video and still or single image data. A stationary video sensor 206 can be arranged in a traffic scene 200 on a stationary platform 210 with possible motion within a sensor mount (e.g., rotation to change video sensor field of view 214). The platform can be a pole 210, for example, or another permanent or portable structure that can be made stationary including a mount attached to a building, for example, and can be positioned within a traffic scene 200 in a region or city, for example. Stationary video sensor 206 can be in communication with a traffic infrastructure system 100 that includes a server computer 120 that can input video sensor data from the stationary video sensor 206 and combine a geographical map of the traffic scene 200 to determine extrinsic camera calibration parameters that characterize the 3D pose of the stationary video sensor 206 with respect to the map, wherein 3D pose means a set of data that includes a 3D location in x, y, and z coordinates measured with respect to a 3D coordinate system like latitude, longitude, and altitude, and 3D rotational coordinates in roll, pitch and yaw measured as rotations about the x, y, and z axis.

A stationary LiDAR sensor 208 can be arranged in a traffic scene 200 on a stationary platform 212, wherein the stationary platform 212 can be a pole 212, for example, or another permanent or portable structure that can be made stationary including a mount attached to a building, for example, and can be positioned within a traffic scene 200 in a region or city, for example. LiDAR data can also be acquired by a plurality of LiDAR sensors including vehicle-mounted LiDAR sensors, drone-mounted LiDAR sensors or other LiDAR sensors mounted on other platforms including stationary platforms. LiDAR sensors, including stationary LiDAR sensor 208 acquires LiDAR sensor data that includes measurements of the range or distance from surfaces in a LiDAR sensor field of view 216 to the LiDAR sensor. The field of view 216 is defined by an inner diameter 218 and an outer diameter 220. Inner diameter 218 is defined by the smallest circumference of range data acquired by stationary LiDAR sensor 208 as stationary LiDAR sensor 208 scans LiDAR sensor field of view 216 radially. Outer diameter 220 is defined by the largest circumference of range data acquired by stationary LiDAR sensor 208 as stationary LiDAR sensor 208 scans LiDAR sensor field of view 216 radially. Multi-mode LiDAR sensor data from a plurality of LiDAR sensors can be combined to form a multi-mode LiDAR map based on data from each of the LiDAR sensors of the plurality of LiDAR sensors.

A LiDAR sensor 208 can acquire range data by pulsing an infrared (IR) laser and calculating a range or distance based on the time of flight for a return pulse reflected from a surface in traffic scene 200. A LiDAR sensor can scan one or more IR lasers while pulsing to acquire data over a laser sensor field of view. LiDAR sensors including stationary LiDAR sensor 208 can acquire multi-modal LiDAR data, wherein multi-modal in the present context means returning both range data and intensity data, wherein the radiant energy of the return IR pulse is acquired and measured. Intensity data measures IR reflectivity of surfaces in the traffic scene 200, where reflectivity is the percentage of incident IR pulse energy reflected by a surface. Objects in traffic scene 200 having surfaces that reflect measurable IR pulse energy include roadway 202 and vehicles 204.

LiDAR sensors including stationary LiDAR sensor 208 can be in communication with a traffic infrastructure system 100 including server computer 120 to input LiDAR sensor data from the plurality of LiDAR sensors and combine LiDAR sensor data to determine a multi-mode LiDAR map data to calibrate stationary video sensor 208. Multi-mode LiDAR data from a plurality of LiDAR sensors can be combined based on LiDAR sensor field of view information and GPS and accelerometer-based Inertial Measurement Units (IMU) position information to convert LiDAR measurements to a global reference coordinate frame by determining a 3D pose for each LiDAR sensor. Converting LiDAR measurements to a global reference coordinate frame permits the LiDAR measurements from a plurality of LiDAR sensors at different locations to be combined in the same frame of reference to form a single multi-modal LiDAR map.

Other techniques used to calibrate stationary video sensor 206 and thereby accurately determine stationary video sensor 206 3D pose relative to a traffic scene 200 can include manually placing multiple physical targets at measured and selected locations in the traffic scene 200. A computing device can determine the pixel location of these targets in a video image together with video sensor information including the magnification of a lens included in the stationary video sensor 206 and the location of the optical center of the lens with respect to the video sensor plane to estimate the stationary video sensor 206 position. Unfortunately, the process of placing multiple targets within video sensor fields of view 214 and scaling this placement to all traffic scenes 200 within a city or region can not only be tedious but expensive and impractical. Techniques described provide an improvement to existing infrastructure sensing technology because the present subject matter does not require any simulated or manually placed targets within the scene and can be performed according to programming in a remote computer by traffic information system 100 as the stationary video sensor 206 acquires data from a traffic scene 200.

A stationary video sensor 206 can be calibrated to determine a 3D pose relative to real world x, y, z, roll pitch and yaw coordinates by maximizing an objective function that measures correspondences between data such as traffic scene features and data extracted from synthetic views of multi-modal sensor data. For example, traffic scene features can be extracted from video images of a traffic scene 200 as viewed from stationary video sensor 206. Synthetic views of multi-modal map data can be acquired by a LiDAR sensor 208 formed by projecting the multi-modal LiDAR sensor data in a global reference coordinate system onto the video sensor field of view 214 to form a reference coordinate frame as viewed from the stationary video sensor 206, assuming that video sensor field of view 214 and multi-modal LiDAR map 216 intersect in 3D space. Mathematically, the registration/calibration process includes maximizing an objective function that describes the alignment of a stationary video sensor 206 with respect to real world coordinates by switching between two terms: the first being to align the synthetic view of the ground reflectivity to the camera image, and the second being to align the synthetic view of the 3D map to the camera image. The optimization of this objective function includes alternating iteratively (i.e., as a switch, i.e., the first, the second, the first, the second, etc.) between aligning the first and second terms. This example includes a joint optimization to estimate the calibration parameters of the first term as a normalized mutual information function measuring alignment between the synthetic view of a map of ground reflectivity, and an image of ground intensity from stationary video sensor 206, and then to estimate the calibration parameters of the second term as edge alignments between synthetic views of 3D map and image intensity discontinuities from video sensor data.

The objective function can be formulated as follows:

$$\hat{\theta} = \arg\max_{\theta} \{-EC(X, y, \theta) + NMI(I, y, \theta)\} \quad (1)$$

Where $\hat{\theta}$ is the estimated 3D pose, $X \in \mathbb{R}^{N_1 \times 3}$ is the 3D LiDAR sensor point cloud of distance measurements corresponding to the 3D structure of a traffic scene 200, which can include an environment or intersection. $I \in \mathbb{R}^{M_1 \times 3}$ is a 2D representation of the ground reflectivity of a traffic scene 200, which can include an environment or intersection, and $y \in \mathbb{R}^{N_2 \times M_2}$ is a stationary video sensor 206 image. The arg max function determines the maximum value of the expression $\{-EC(X,y,\theta)+NMI(I,y,\theta)\}$ evaluated with respect to $\theta$. The edge cost function EC in (1) penalizes miss-alignments between a 2D projection of the 3D point-cloud edges $X_e$ and the edges computed from the 2D camera image $y_e$. This function can be expressed mathematically by:

$$EC(X_e, y_e, \theta) = \frac{1}{E} \sum_{n=1}^{N_2 \times M_2} \exp\left(\frac{-|[y_e]_n|^2}{\sigma^2}\right) \cdot [f(X_e, \theta)]_n \quad (2)$$

Here, the function $f$ projects the 3D point cloud into the 2D reference frame using the current 3D pose parameters $\theta$ and the intrinsic camera calibration parameters. The scalar E is a normalization variable which causes the maximum sum in (2) to be of unit energy. The parameter $\sigma \in \{0.1, 0.01, 0.001\}$ is a scalar that controls the smoothness of edges which in turn controls the radius of convergence given an initialization. The operator $[\cdot]_n$ is a column-wise vectorization that selects the particular entry indexed by n of the vectorized image.

The second term in (1), normalized mutual information (NMI) function promotes alignments between the ground reflectivity I from multi-mode LiDAR map reference coordinate frame and the ground intensity extracted from the stationary video sensor 206 image y and is expressed as $$NMI(I, y, \theta) = \frac{H(f(I, \theta)) + H(g(y))}{H(f(I, \theta), g(y))} \quad (3)$$

where H(A) in the entropy of the random variable A and H(A, B) is the joint entropy of the random variables A and B. Here, the function g: $\mathbb{R}^{N_2 \times M_2} \to \mathbb{R}^{N_2 \times M_2}$ segments and extracts a ground plane (e.g., roadway 202) from the stationary video sensor 206 image. Ground extraction can be performed using machine vision techniques including segmentation and road detection algorithms that rely on determining geometric parameters for determined connected regions. The iterative optimizer that maximizes such cost function by alternating modalities is described below in relation to FIG. 5. At each iteration, gradient functions can be numerically estimated using the following:

$$\nabla EC(X_e, \theta, f) = \left[\frac{d}{\phi_{roll}} \frac{d}{\phi_{pitch}} \frac{d}{\phi_{yaw}} \frac{d}{d_x} \frac{d}{d_y} \frac{d}{d_z}\right]^T \cdot EC(X_e, \theta, f) \quad (4)$$

$$\nabla NMI(I, \theta, f) = \left[\frac{d}{\phi_{roll}} \frac{d}{\phi_{pitch}} \frac{d}{\phi_{yaw}} \frac{d}{d_x} \frac{d}{d_y} \frac{d}{d_z}\right]^T \cdot NMI(I, \theta, f) \quad (5)$$

where the operator $$\frac{d}{d_x}$$

is to partial derivative with respect to the variable x. This algorithm is a gradient ascent algorithm that contains a switchable element at each iteration to alternate between optimizing in each of the modalities. At iteration t the objective function $\theta^t$ can be determined based on the objective function from a previous iteration $\theta^{t-1}$ according to:

$$\theta^t = \theta^{t-1} - \lambda[\gamma \nabla EC(X_e, \theta^{t-1}, f) - (1-\gamma)\nabla NMI(I, \theta^{t-1}, f)] \quad (6)$$

where $\lambda=0.1$ is a learning parameter that can be determined by user input and $\gamma$ is a variable that alternates between 1 and 0 when iterating, and controls which gradients will be optimized. Equation (6) can be optimized by determining convergence. Convergence is defined as a technique for determining a stopping condition for an iterative process by comparing a current result with a previous result and comparing the amount of change with a stopping criterion. Gradient ascent algorithm convergence can be determined when a difference between $\theta^t$ and $\theta^{t-1}$ is less than a stopping criterion, which can be determined by user input. At this point the objective function can return $\hat{\theta} = \theta^{t-1}$ as the estimated 3D pose of a stationary video camera 206.

Techniques described herein to calibrate a stationary video sensor 206 by iteratively optimizing the alignment between multi-modal LiDAR map 3D point cloud data and multi-modal Lidar map reflectivity data and stationary video sensor 206 image data improve traffic infrastructure system operation by calibrating a stationary video sensor 206 without requiring cumbersome, often inaccurate, and expensive manual placement of alignment targets in video sensor field of view 214. In addition, techniques described herein have an increased capability of calibrating more traffic scenes 200 than when only one modality is used. For example, consider a traffic scene 200 without the presence of objects above a ground plane, i.e., there is no edge information from objects above the ground plane to exploit. In other examples where road markings in the ground have been degraded with time and when acquired, introduce no contrast or information changes in the ground in both geographical map data and video sensor images. In such scenario a calibration based on this information only would suffer since there is no such ground information to exploit. In contrast, the calibration procedure described herein can exploit the structure of both the 3D distance data and reflectivity data corresponding to the traffic scene 200, and thereby compensate when information is missing in one of the other modalities.

Figure 3:
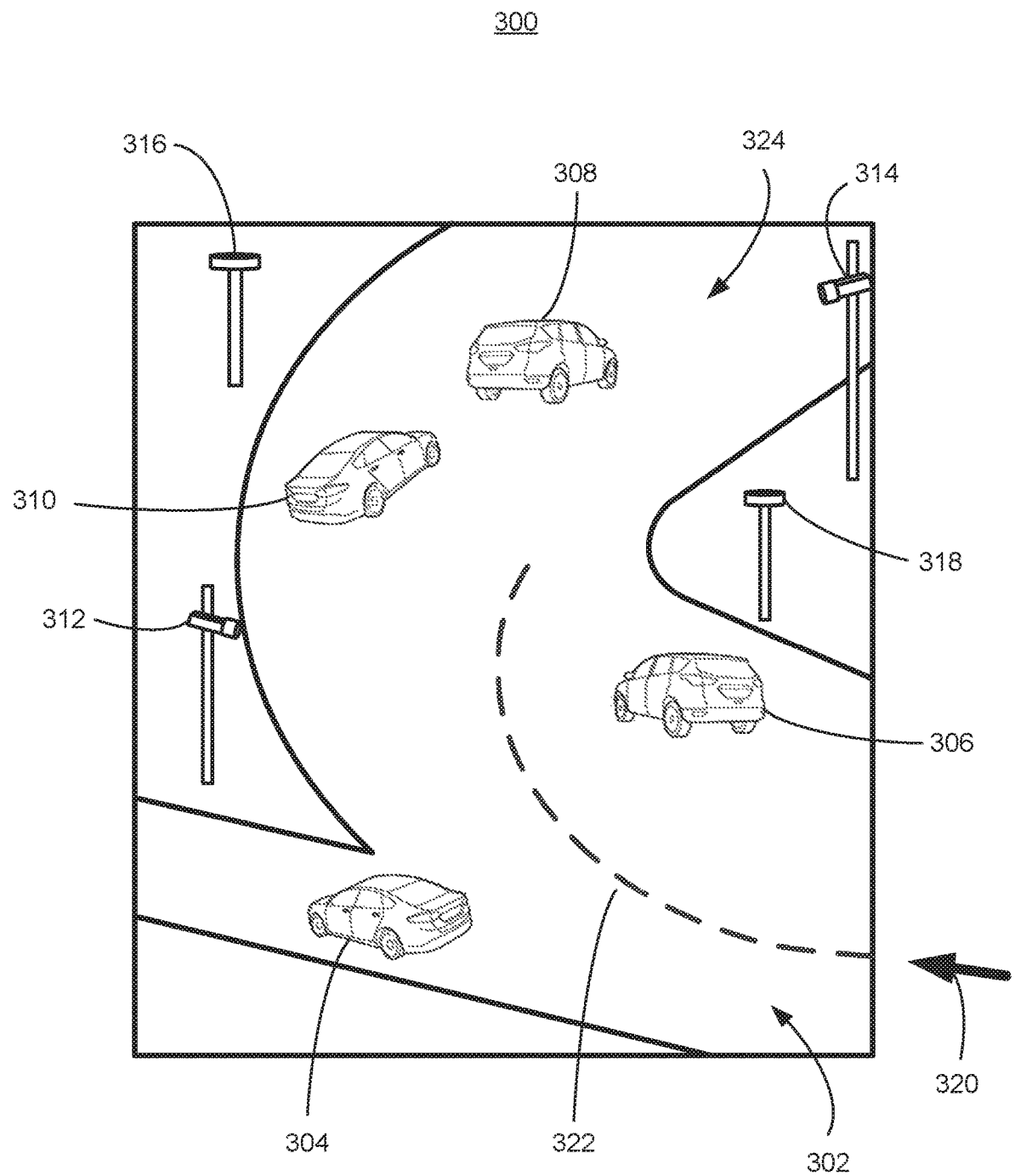
FIG. 3 is a diagram of an example cognitive map.

FIG. 3 is a diagram of an example cognitive map 300. A cognitive map 300 is a 2D, top-down map of a real world environment near a vehicle 110 including a roadway 302. In map 300, vehicle 110 is approaching the portion of the real world environment corresponding to cognitive map 300 in the direction of arrow 320. A map can be constructed by computing device 115 based on real world 3D pose information regarding vehicle 110 acquired from sensors 116 included in vehicle 110 like GPS and inertial navigation systems (INS), information from multi-model LiDAR sensors and geographical map data like GOOGLE maps downloaded via V-to-I interface 111 from a server computer 120 or the Internet via network 130, for example. A vehicle 110 computing device 115 can also receive video data from stationary video sensors 312, 314 including moving objects, then locate the moving objects in a cognitive map 300. Stationary video sensors 312, 314 can be calibrated according to techniques discussed above in relation to equations (1)-(6), above based on multi-mode LiDAR map data acquired by LiDAR sensors including stationary LiDAR sensors 316, 318. Stationary video sensor 206 can determine moving objects using machine vision techniques to segment moving foreground object pixels from background pixels in a video image. Based on 3D pose and field of view 214 information, computing device 115 can project regions of connected pixels corresponding to moving objects 304, 306, 308, 310 from video sensor data onto the cognitive map 300 based on the location of the connected pixels in the sensor data. Cognitive map 300 can include moving objects 304, 306, 308, 310, indicated collectively and individually by the reference numeral 324. Computing device 115 can place icons corresponding to vehicles for moving objects 324 onto the cognitive map 300.

A traffic information system 100 can detect moving objects 324 that can be out of the fields of view of sensors 116 in a vehicle 110. For example, stationary video sensors 312, 314 can detect moving objects 324 corresponding to vehicles that can be obscured from view or beyond the field of view of sensors 116 in vehicle 110. Computer 120 can detect vehicle 110 and, based on determined location, speed and direction information regarding vehicle 110, communicate with computing device 115 including downloading data regarding moving objects 324 and their real world locations to permit computing device 115 to add vehicle icons corresponding to moving objects 324 onto cognitive map 300 in response to receiving the data from a traffic information system 100.

Computing device 115 can use cognitive map 300 to operate vehicle 110 by determining a path polynomial 322 that estimates future vehicle trajectories for vehicle 110. A path polynomial in this context is a polynomial function of degree three or less that describes successive locations of a vehicle 110. Vehicle trajectories include a vehicle 3D pose and accelerations with respect to x, y, z, roll, pitch and yaw. Vehicle trajectories can also include vehicle 2D location with respect to a ground plane, speed, direction and lateral and longitudinal accelerations with respect to the direction. Computing device 115 can determine a path polynomial 322 that permits a vehicle 110 to reach a local destination at a target speed while maintaining upper and lower limits on lateral and longitudinal accelerations and avoiding collisions and near-collisions with moving objects 324. Determining a path polynomial 322 that can reach a local destination while avoiding collisions and near-collisions with moving objects 324 depends upon receiving accurate information regarding the 3D pose of stationary video systems 312, 314. Calibrating stationary video systems 312, 314 based on multi-modal LiDAR sensor data can improve the operation of a vehicle 110 by providing accurate video data without requiring calibration with physical targets.

Figure 4:
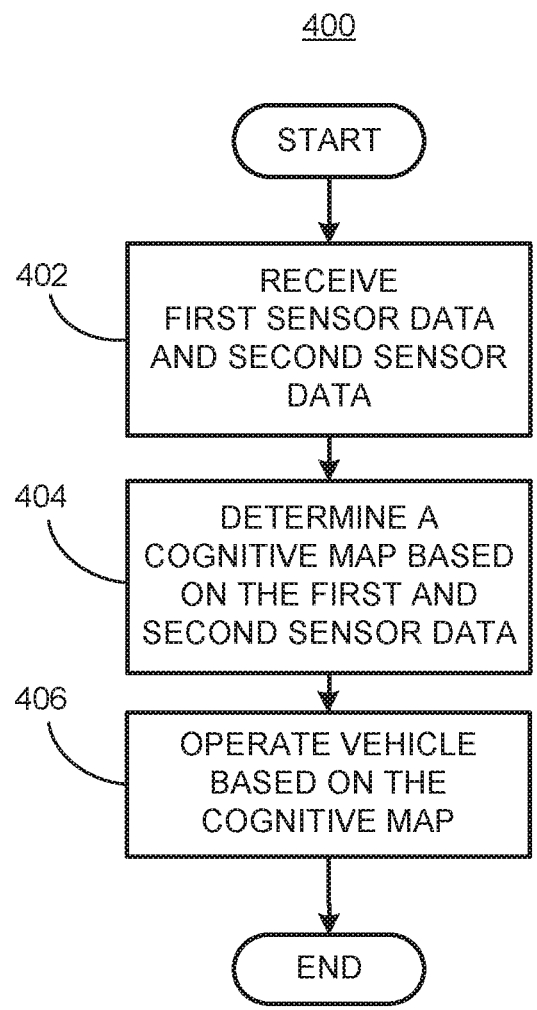
FIG. 4 is a flowchart diagram of an example process to operate a vehicle based on a multi-modal LiDAR map.

FIG. 4 is a diagram of a flowchart, described in relation to FIGS. 1-3, of a process 400 for operating a vehicle 110 based on receiving calibrated first sensor data. Process 400 can be implemented by a processor of computing device 115, taking as input information from sensors 116, and executing commands and sending control signals via controllers 112, 113, 114, for example. Process 400 includes multiple blocks taken in the disclosed order. Process 400 could alternatively or additionally include fewer blocks or can include the blocks taken in different orders.

Process 400 begins at block 402, in which a computing device 115 included in a vehicle 110 can receive, via V-to-I interface 111, first sensor data including moving objects. The first sensor can be a stationary video sensor 206. The stationary video sensor 206 is calibrated based on multi-mode LiDAR sensor data including stationary LiDAR sensor 208 data as discussed above in relation to FIG. 2, above.

At a block 404, computing device 115 can determine a cognitive map 300 based on vehicle 110 sensor 116 data, stationary video sensor 206 data, stationary LiDAR sensor 208 data and map data including moving objects detected in stationary video sensor 206 data as discussed above in relation to FIG. 3. Moving objects included in a cognitive map 300 based on first sensor data can be moving objects that are not visible to vehicle 110 sensors 116. Computing device can determine a path polynomial 322 to operate vehicle 110 as discussed above in relation to FIG. 3

At a block 406, computing device 115 can operate vehicle 110 by commanding vehicle 110 powertrain, steering and braking via controllers 112, 113, 114 to cause vehicle 110 to operate along path polynomial 322 at a target speed on roadway 302 while avoiding collisions or near-collisions with moving objects 324. Following block 406 process 400 ends.

Figure 5:
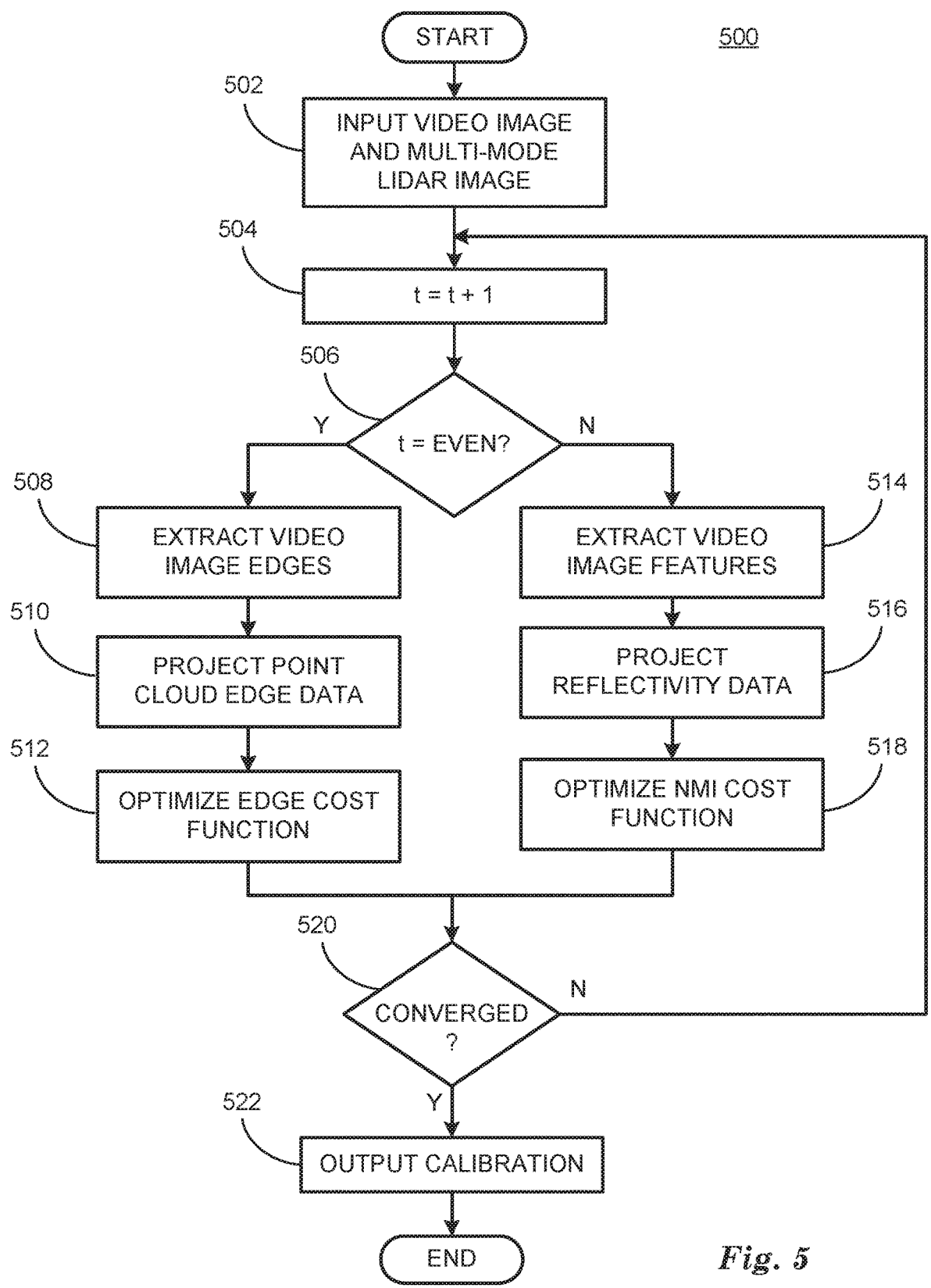
FIG. 5 is a flowchart diagram of an example process to calibrate video and LiDAR sensors.

FIG. 5 is a diagram of a flowchart, described in relation to FIGS. 1-3, of a process 500 for calibrating a stationary video sensor 206 based on multi-mode LiDAR map. Process 500 can be implemented by a processor of server computer 120, taking as input information from stationary video sensor 206, a LiDAR sensor including stationary LiDAR sensor 208 and executing commands and outputting calibration results via network 130, for example. Process 500 includes multiple blocks taken in the disclosed order. Process 500 could alternatively or additionally include fewer blocks or can include the blocks taken in different orders.

Process 500 begins at block 502, in which a server computer 120 acquires a stationary video sensor 206 image and multi-mode LiDAR map. Multi-mode LiDAR map includes both 3D point cloud data and reflectivity data.

At block 504 server computer 120 increments an iteration counter t=t+1.

At block 506 server computer 120 tests the iteration counter t to determine if it is odd or even. If even, process 500 branches to block 508. If odd, process 500 branches to block 514.

At block 508 server computer 120 extracts edges from stationary video sensor 206 image data to form an edge image $y_e$.

At block 510 server computer 120 projects LiDAR point cloud edge data $X_e$ onto the camera image reference frame using a function $f(X_e,\theta)$ At block 512 server computer 120 calculates a gradient function $\nabla EC(X,\theta^{t-1},f)$ as discussed above in relation to FIG. 2, above, and optimizes an edge based cost function based on the edge image and the LiDAR point cloud edge image projection. Following block 512, process 500 proceeds to block 520.

At block 514 server computer calculates feature/ground extraction on stationary video sensor 206 image data using function g(y) as discussed above in relation to FIG. 2 to extract roadway 302 features from stationary video sensor 206 image data to form a ground image.

At block 516 server computer 120 projects LiDAR map reflectivity data I onto the video image reference coordinate system using a function $f(I,\theta)$ as discussed above in relation to FIG. 2.

At block 518 server computer 120 determines an NMI gradient function $\nabla NMI(I,\theta^{t-1},f)$ as discussed above in relation to FIG. 2 based on the projected reflectivity map data and video image data, processed to extract a ground plane. Server computer 120 optimizes an NMI cost function based on the ground plane and the projected LiDAR reflectivity map data. Following block 518, process 500 passes to block 520.

At block 520 server computer 120 determines a new estimate of the 3D pose of stationary video system 206 $\theta^t$, and compares the new estimate with a previous estimate $\theta^{t-1}$ to determine whether the calibration process 500 has converged by comparing the difference between $\theta^t$ and $\theta^{t-1}$ to a user input stopping criterion. When the difference is greater than a user input stopping criterion, process 500 branches back to block 504 to perform another iteration. When the difference is less than or equal to a user input stopping criterion, process 500 passes to block 522.

At block 522 server computer 120 outputs the estimated calibration $\hat{\theta}=\theta^{t-1}$ to stationary video sensors 212, 214 to include with video sensor data transmitted to vehicle 110 via traffic information system 100 and server computer 120. Vehicle 110 can use the estimated calibration data to calibrate stationary video sensor 206 to permit computing device 115 to accurately place data regarding moving objects 324 received from stationary video sensors 212, 214 accurately within a cognitive map 300.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A method, comprising:
receiving first sensor data including moving objects and multi-modal LiDAR map data that includes both (a) range data that measures distance and (b) intensity data that measures infrared reflectivity, wherein the first sensor is calibrated based on a cost function that alternates between LiDAR map point cloud range data and LiDAR map ground reflectivity intensity data as input; and
operating a vehicle based on the moving objects.

2. The method of claim 1, wherein the first sensor is a stationary video sensor, and the multi-modal LiDAR map data is acquired from a LiDAR sensor of a plurality of LiDAR sensors.

3. The method of claim 2, further comprising calibrating the stationary video sensor by projecting LiDAR map point cloud data onto a stationary video sensor image reference coordinate frame based on a 3D pose and a field of view of the stationary video sensor.

4. The method of claim 3, further comprising calibrating the stationary video sensor by projecting LiDAR map ground reflectivity data onto the stationary video sensor image reference coordinate frame based on a 3D pose and the field of view of the stationary video sensor.

5. The method of claim 4, further comprising:
calibrating the stationary video sensor by determining edge miss-alignment cost (EC) between projected LiDAR map point cloud edge data and video edge data;
determining normalized mutual information (NMI) between projected LiDAR map ground reflectivity data and ground extracted stationary video sensor data; and
alternating between EC and NMI to optimize the cost function.

6. The method of claim 5, further comprising determining a convergence of the cost function by comparing a difference between results of a current iteration and results of a previous iteration with a constant determined by user input.

7. The method of claim 1, wherein operating the vehicle includes determining a cognitive map of an environment around the vehicle including downloading map data from a server computer and projecting moving objects in the first sensor data onto the map.

8. The method of claim 7, wherein operating the vehicle includes determining a path polynomial including vehicle trajectories on the cognitive map.

9. The method of claim 8, wherein determining the path polynomial includes avoiding collisions and near-collisions with moving objects on the cognitive map.

10. A system, comprising a processor; and
a memory, the memory including instructions to be executed by the processor to:
receive first sensor data including moving objects and multi-modal LiDAR map data that includes both (a) range data that measures distance and (b) intensity data that measures infrared reflectivity, wherein the first sensor is calibrated based on a cost function that alternates between LiDAR point cloud range data and LiDAR ground reflectivity intensity data as input; and
operate the vehicle based on the moving objects.

11. The system of claim 10, wherein the first sensor is a stationary video sensor, and the multi-modal LiDAR map data is from a plurality of LiDAR sensors.

12. The system of claim 11, further comprising calibrating the stationary video sensor by projecting LiDAR map point cloud data onto a stationary video sensor image reference coordinate frame based on a 3D pose and a field of view of the stationary video sensor.

13. The system of claim 12, further comprising calibrating the stationary video sensor by projecting LiDAR map ground reflectivity data onto the stationary video sensor image reference coordinate frame based on a 3D pose and the field of view of the stationary video sensor.

14. The system of claim 13, further comprising:
calibrating the stationary video sensor by determining edge miss-alignment cost (EC) between projected LiDAR map point cloud edge data and video edge data;
determining normalized mutual information (NMI) between projected LiDAR ground reflectivity map data and ground extracted stationary video sensor data; and
alternating between EC and NMI to optimize the cost function.

15. The system of claim 14, further comprising determining a convergence of the cost function by comparing a difference between results of a current iteration and results of a previous iteration with a constant determined by user input.

16. The system of claim 10, wherein operating the vehicle includes determining a cognitive map of an environment around the vehicle including downloading map data from a server computer and projecting the moving objects onto the cognitive map.

17. The system of claim 16, wherein operating the vehicle includes determining a path polynomial including vehicle trajectories on the cognitive map.

18. The system of claim 17, wherein determining the path polynomial includes avoiding collisions and near-collisions with moving objects on the cognitive map.

19. A system, comprising:
   means for controlling vehicle steering, braking and powertrain; and
   means for:
      receiving first sensor data including moving objects and multi-modal LiDAR map data that includes both (a) range data that measures distance and (b) intensity data that measures infrared reflectivity, wherein the first sensor is calibrated based on a cost function that alternates between LiDAR map point cloud range data and LiDAR ground reflectivity intensity data as input; and
      operating the vehicle based on the moving objects and the means for controlling vehicle steering, braking and powertrain.

20. The system of claim 19, wherein the first sensor is a stationary video sensor, and the multi-modal LiDAR map data is from a LiDAR sensor of a plurality of LiDAR sensors.

* * * * *